United States Patent
Casey et al.

(10) Patent No.: US 6,199,108 B1
(45) Date of Patent: Mar. 6, 2001

(54) SIMPLIFIED SETTING UP OF A NETWORK OF SERVER COMPUTERS PRELOADED WITH ALL COMPUTER PROGRAMS REQUIRED BY A GROUP OF CLIENT COMPUTERS

(75) Inventors: Walter William Casey; Jeffrey Randell Dean; Ingrid Milagros Rodriguez, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,211

(22) Filed: Jul. 17, 1998

(51) Int. Cl.[7] ................................................. G06F 15/177
(52) U.S. Cl. .............................. 709/220; 709/221; 370/2
(58) Field of Search ................................ 709/221, 220, 709/224, 102, 201; 370/2

(56) References Cited

U.S. PATENT DOCUMENTS

| | | | | |
|---|---|---|---|---|
| 5,684,952 | * | 11/1997 | Stein ..................................... | 709/221 |
| 5,842,011 | * | 11/1998 | Basu ........................................ | 713/2 |
| 5,974,547 | * | 10/1999 | Llimenko ................................ | 713/2 |
| 6,012,088 | * | 1/2000 | Li et al. ................................ | 709/219 |

\* cited by examiner

*Primary Examiner*—Zarni Maung
*Assistant Examiner*—Khanh Quang Dinh
(74) *Attorney, Agent, or Firm*—J. B. Kraft; Richard A. Henkler; Leslie A. VanLeeuwen (57) ABSTRACT

A system is provided for setting up what is in effect a "plug and play" local area network for small businesses comprising a server computer and a plurality of client computers. The server computer is preloaded with a network operating system, an operating system for each of the client computers and substantially all application programs to be used by the client computers. There is a programmed interactive display interface in the server computer for interactively prompting a user to make a sequence of data entries relative to the computing needs of the client computers and the users of the client computers. The server computer is then physically interconnected with the client computers. Then means in the server computer allocate the client operating systems and the application programs as needed by the user of the client computers based upon the set up resulting from the prompted data entries.

21 Claims, 12 Drawing Sheets

```
Company Address and Phone
─────────────────────────────────────────
Type your company's address, phone and fax numbers below. This
Information may be required for licensing and software registration.
  Mailing Address
  [                        ]

Physical Address
  [                        ]

Phone [        ]
             Fax [        ]

[ Help ] [ < Back ] [ Next > ] [ Cancel ]
```

FIG.6

```
Internet Pricing
─────────────────────────────────────────
To obtain internet access, you will want to review the current pricing
schedule below. If you agree to the pricing defined, you will need to
enter credit card information for the charges. The billing will occur
monthly. If you chose not to obtain internet access, leave the card
information blank and click on Next.

┌─ Pricing ──────────────────────┐
│ $100.00 / Month for 130 hours/ │    ┌─────────────────────────┐
│ month                          │    │ Review Terms and Conditions │
│ $1.10 / Hour for Each          │    └─────────────────────────┘
│ Additional Hour Actually Used  │
┌─ Credit Card Info ─────────────┐
│ Card Number                    │
│   [ Text1 ]                    │ ── 61
│             [ Text2 ]          │ ── 62
└────────────────────────────────┘

[ Help ] [ < Back ] [ Next > ] [ Cancel ]
```

Backup Schedule

Your data will automatically be backed up at the times you indicate below. Online backup means your data will be copied to a computer system at another location. Tape backup means your data will be copied to magnetic tape and stored at another location. Backup should be done at a time when people are not working on the system. Type the times below that are outside of your normal working hours.

― Scheduling ―
How early do employees start work?
[6:00AM] ⎯ 67
How late do employees leave work?
[8:30PM] ⎯ 68
How often do you want to back up your data?
[Sundays Only]

[Help] [< Back] [Next >] [Cancel]

FIG.12

Data Security

To make sure that your data is secure, you will be asked to type a key (password) to access the data that Connected Online Backup has stored for you. The key can be any combination of up to ???? characters, with no spaces. For future reference, make a note of the key and indicate if you have used upper or lower case characters. For added safety, you can store a copy of the key with the Connected Online Backup service by checking the box below.

― Data Encryption ⎯ 69
Key [xxxx]
Retype Key [xxxx]
Store the Key Offsite also [ ]
⎯ 70

[Help] [< Back] [Next >] [Cancel]

SIMPLIFIED SETTING UP OF A NETWORK OF SERVER COMPUTERS PRELOADED WITH ALL COMPUTER PROGRAMS REQUIRED BY A GROUP OF CLIENT COMPUTERS

CROSS-REFERENCE TO RELATED APPLICATIONS

The present patent application is related to Ser. No. 09/118,208, (pending) entitled "CONFIGURING COMPUTER NETWORK OPERATIONS BASED UPON THE CORRELATION OF A SEQUENCE OF INTERACTIVE DISPLAY USER ENTRIES APPARENTLY UNRELATED TO COMPUTER OPERATIONS" which is hereby incorporated by reference herein.

The present patent application is related to Ser. No. 09/118,207, (pending) entitled "METHOD AND APPARATUS FOR CREATING A PRELOAD IMAGE" which is hereby incorporated by reference herein.

In addition, the following applications are also related to the present invention:

The present patent application is related to Ser. No. 09/118,559, (pending) entitled "SYSTEM AND METHOD FOR CREATION OF A NETWORK COMPUTING ENVIRONMENT".

The present patent application is related to Ser. No. 09/118,557, (pending) entitled "DATA PROCESSING SYSTEM, METHOD, AND PROGRAM PRODUCT FOR AUTOMATING ACCOUNT CREATION IN A NETWORK".

The present patent application is related to Ser. No. 09/118,293, (pending) entitled "COMPUTER SOFTWARE SYSTEM FOR ELIMINATING OPERATING SYSTEM MULTIPLE LOGINS UNDER REMOTE PROGRAM LOAD WITH NETWORK PROVIDER DYNAMIC LINK LIBRARY".

The present patent application is related to Ser. No. 09/118,210, (pending) entitled "CONFIGURING COMPUTER NETWORK OPERATIONS BASED UPON A SEQUENCE OF INTERACTIVE USER ENTRIES INTO A NETWORK SERVER COMPUTER WITH A ONE TIME ENTRY OF DATA COMMONLY REQUIRED BY MULTIPLE CLIENTS".

The present patent application is related to Ser. No. 09/118,560, (pending) entitled "NETWORK WITH STORAGE OF ALL CLIENT COMPUTER PROGRAMS IN SERVER COMPUTER HAVING CUSTOMIZED CLIENT GRAPHICAL USER INTERFACES WITH MAXIMUM SHARING OF STORED PORTIONS OF INTERFACES COMMON TO A PLURALITY OF CLIENTS".

The present patent application is related to Ser. No. 09/118,292, U.S. Pat. No. 6,108,779, entitled "SERVER AND COMPUTER NETWORK THAT PERMIT A CLIENT TO BE EASILY INTRODUCED INTO THE COMPUTER NETWORK".

The present patent application is related to Ser. No. 09/118,209 (pending) entitled "METHOD AND APPARATUS FOR ALLOWING A USER TO ROVE AMONG VARIOUS CLIENTS IN A NETWORK WHILE MAINTAINING INDIVIDUAL HARDWARE AND SOFTWARE PREFERENCES".

The present patent application is related to Ser. No. 09/118,558, (abandoned) entitled "METHOD AND APPARATUS FOR ALLOWING A USER TO ROVE AMONG VARIOUS CLIENTS IN A NETWORK WHILE MAINTAINING INDIVIDUAL HARDWARE PREFERENCES".

The present patent application is related to Ser. No. 09/118,555, (pending) entitled "AUTOMATIC CLEANUP OF USER DATA IN A NETWORK ENVIRONMENT".

The present patent application is related to Ser. No. 09/118,556, now U.S. Pat. No. 6,105,100 entitled "METHOD AND APPARATUS FOR DETECTING AND INITIALIZING THE ADDITION OF A NEW CLIENT MACHINE IN A NETWORK".

TECHNICAL FIELD

The present invention relates to a system, method and program for the configuration of a computer network and particularly a local network of server computers and client computers in a manner which is expeditious and involves very little down time of the network or its components.

BACKGROUND OF THE INVENTION

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement in the Internet. As a result of these changes, it seems as if virtually all aspects of human productivity in the industrialized world require human/computer interaction. The computer industry has been a force for bringing about great increases in business and industrial productivity. Almost every week seems to bring computer industry advances which promise even further increases in productivity. These advances offer to drive down business and industry costs and increase efficiency in addition to increasing productivity. In addition, the cost of "computer power" continues to drop as result of rapid advances in computer related technologies.

Despite all of these advantages there still remains great resistance in all industries and business fields to new computer systems and significant system upgrades which offer much in productivity increases. This resistance results from past experience which equates to installing new computer systems or significant upgrades in existing systems with large amounts of down time, during which the business, manufacturing facility or individual worker functions are inoperative or operate at diminished levels. When a business or production facility is trying to decide whether to install a new computer system, the concern about down time, the possible loss of business, as well as stress on the workers involved very often outweighs the cost of the installation in influencing the decision. The concern about business and production delays resulting from installation has become so great that fewer and fewer small businesses are trying to make system and program changes on their own. This concern is even greater when the business is considering the installation of a computer network. While many businesses would likely be much more productive if their computers were interconnected with each other, the thought of a network may be very frightening to many small businesses without too much computer experience. They are likely to consider the concepts to be learned and the technology required to connect two or more computers in a network as too complex, time consuming or error prone to be attempted by the average small business user or owner.

The professional computer service industry which carries out and supports installations and upgrades for the business and industrial sector has been rapidly expanding over the past decade. However, even with such computer professional support, the threat of such down time, coupled with the costs of such professional services caused by installation delays remains of great concern.

There is a substantial challenge in the installation of computer network systems for small businesses. In this marketplace, we are dealing with a group whose available time is being stressed to its limits by the pressures of current economic systems. Even though the network computer systems procurable by these business people may offer eventual salvation to their other business stresses, the prospect of a new computer installation is often quite ominous to them.

SUMMARY OF THE INVENTION

The present invention provides a solution to the above problems by providing to small businesses and like enterprises what is practically a "plug and play" network set up and configured to their business needs. A network of a server computer and a plurality of client computers is shipped to the small business with the server computer already preloaded with a network operating system, an operating system for each of said client computers and substantially all application programs to be used by said client computers. Display interface means are provided in said server computer for interactively prompting a user to make a sequence of data entries relative to the computing needs of said client computers and the users of said client computers. Thus, the users or their business manager, essentially unpacks the server and makes the above sequence of simple data entries. Then the server is interconnected with the client computers and the network is up and ready to go. The server computer has means for allocating the client operating systems and said application programs to the clients and users based upon the above data entries. These allocations are usually responsive to user interactive entries on the interconnected client computers in response to specific needs of users as indicated by profiles of application programs allocated for each user based upon said data entries, which profiles are stored under the control of the server computer. Among the programs allocated would be Internet access programs, as well as E-Mail programs.

The system of the present invention also provides for means through the display interface to the server computer for adding an additional client computer to said network by prompting a user to make a sequence of data entries relative to the computing needs of said additional client computer and the users of said client computer.

DETAILED DESCRIPTION OF THE PREFERRED EMBODIMENT

Figure 1:
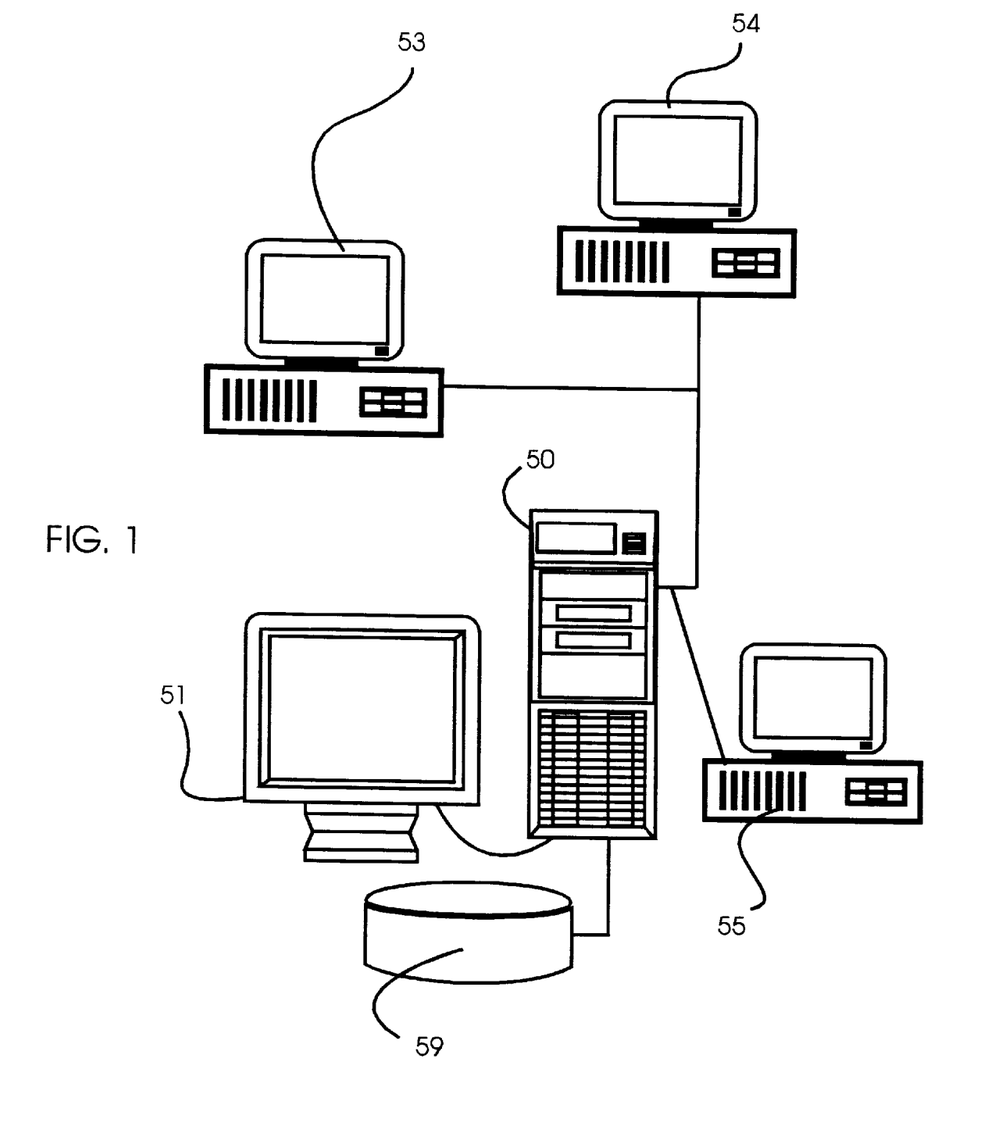
FIG. 1 is a generalized diagranmmatic view of a network of server and client computers which may be configured according to the present invention.

With reference to FIG. 1 there is shown a representative diagram of a local network which may be set up in accordance with the present invention. The server computer 50 which has a plurality of client computers: clients 53, 54 and 55. As will be subsequently described with respect to FIGS. 3 through 14, all configuration entries and settings are made into and stored in server 50 through its display interface 51. All programs for the network and for the computers in the network are also loaded into server 50 and stored in storage facility 59 which is a diagrammatic representation of the primary server storage capability, usually on an associated disk drive. As will be seen from the subsequent description, all of the programs to be used in the overall network are stored in association with server 50, e.g. in its storage facility 59, and then distributed as needed to the network users who will sign on to the client computers 53 through 55. The server 50 will allocate the appropriate programming applications to the signed on users at the appropriate client computers. In the preferred operations, there will essentially be no operating systems or programs stored in the client computers other than just basic utilities needed to physically turn on and run the computers.

Figure 2:
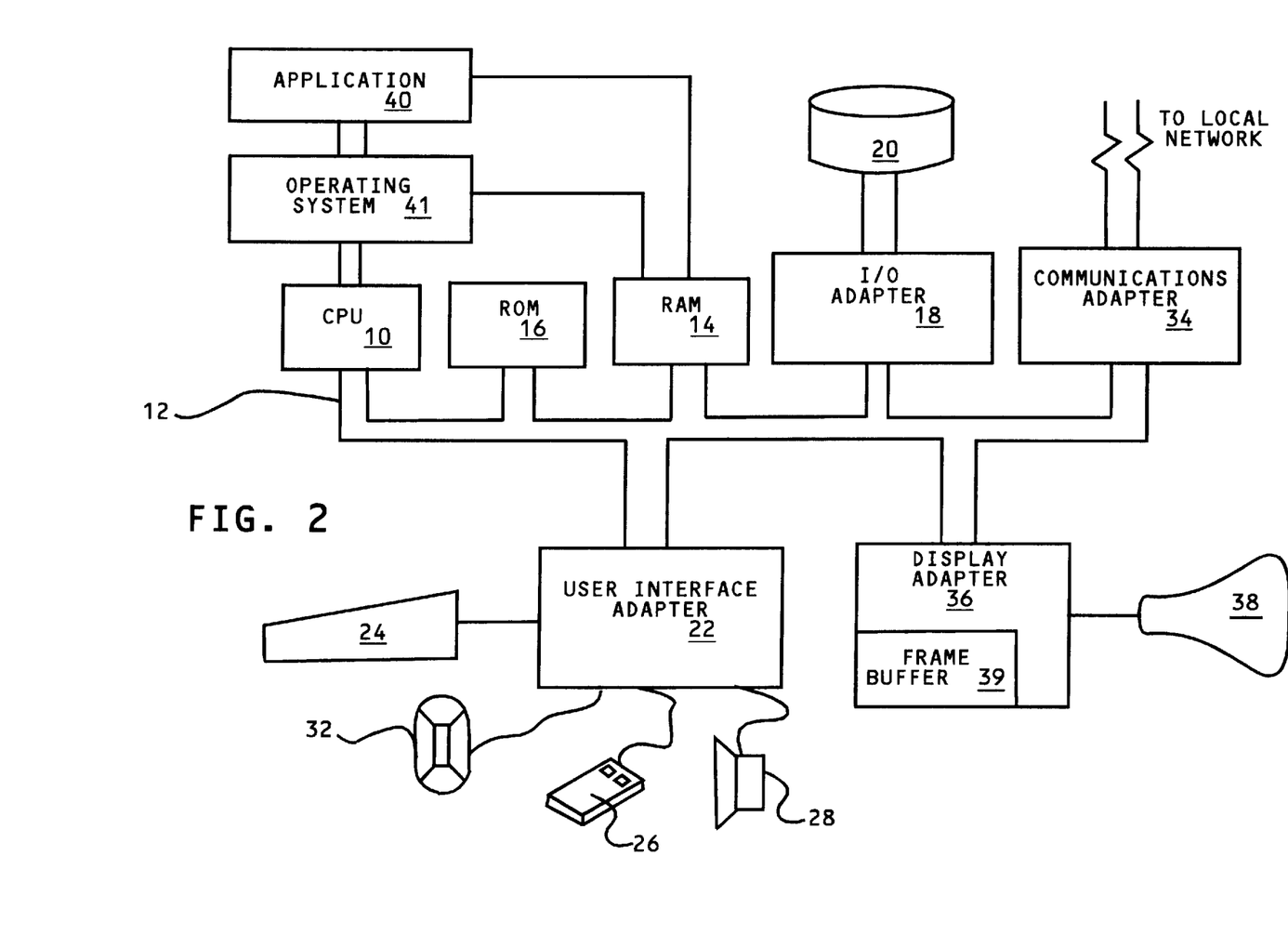
FIG. 2 is a block diagram of an interactive data processor controlled workstation display system including a central processing unit which is capable of serving as the primary server of this invention.

FIG. 2 is a diagram of a display interface workstation which can function as the primary server 50. A central processing unit (CPU), such as in one of the PC Server series of workstations available from International Business Machines Corporation, or the Poweredge 2200 ("Poweredge 2200" is a trademark of Dell Corporation) server from Dell Corporation is provided and interconnected to various other components by system bus 12. An operating system 41 runs on CPU 10 and provides control and is used to coordinate the function of the various components of FIG. 2. Operating system 41 may be one of the commercially available network operating systems such as Microsoft's Windows NT™, IBM's NetView™ or Novell's NetWare™. UNIX or AIX Network operating systems may also be used. The programming application for controlling all of the entries and consequent allocation of operating systems and application programs to client computers to be subsequently described for FIGS. 3 through 14, application 40, runs in conjunction with operating system 41 and provides output calls to the operating system 41, which implement the various functions to be performed by the application 40. A read only memory (ROM) 16 is connected to CPU 10 via bus 12 and includes the basic input(output system (BIOS) that controls the basic computer functions. Random access memory (RAM) 14, which will provide for a portion of the basic storage of entries to be subsequently described; I/O adapter 18 and communications adapter 34 are also interconnected to system bus 12. It should be noted that software components, including the operating system 41 and the application 40, are loaded into RAM 14, which is the computer system's main memory when the operating system and application programs are activated. I/O adapter 18 conventionally communicates with the disk storage device 20, i.e. a hard drive which will also be involved in the subsequently described storage. Communications adapter 34 interconnects bus 12 with the rest of the local network described in FIG. 1 enabling the data processing system to communicate with its client computers to control entry configurations and the allocation of programs to be subsequently described. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the present invention may be implemented. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

It should be noted that the operating systems and all application programs to be allocated to the client computers will be stored mainly in disk storage 20 and, when calls are made to distribute such programs to a particular client, a copy of the program will be transmitted to the client through I/O adapter to system bus 12 through communications adapter 34 through the Local Network connection. The operating system copy or application program copy to be used by the client will be received in the RAM of the client and then used by the client in a conventional manner as if the program came from the client's own disk storage. In this connection, it should be noted that the client computer will have the same general configuration as the server computer shown in FIG. 2, except that the client will not need a disk storage device since all software is being stored on the server. Also, the client computer may be any standard PC such as those available from International Business Machines Corporation or Dell Corporation. The operating systems for the client PCs may be any standard PC operating system such as the OS/2™ operating system available from International Business Machines Corporation, Microsoft Windows 95™, as well as UNIX or AIX PC operating systems.

There will now be described a simple illustration of the present invention with respect to the display screens of FIGS. 3 through 14. When the screen images are described it will be understood that these may be rendered by storing an image and text creation programs, such as those in any conventional window operating system in the RAM 14 of the system of FIG. 2. The operating system is diagrammatically shown in FIG. 2 as operating system 41. Display screen images are presented to the viewer on display monitor 38 of FIG. 2. In accordance with conventional techniques, the user may control the screen interactively through a conventional I/O device, such as mouse 26 of FIG. 2 which operates through user interface 22 to call upon programs in RAM 14 cooperating with the operating system 41 to create the images in frame buffer 39 of display adapter 36 to control the display on monitor 38. As has been set forth hereinabove, all of the programs to be used by all of the users in the network of FIG. 1 are stored in server 50 and its associated storage facility 59. Now with respect to FIGS. 3 through 14, we will describe how information is solicited from users so that the application programs and operating systems stored in the server computer may be allocated among the users of the client computers in the network. The illustration will involve allocations within a small business network. Please note with respect to FIG. 1, the data entry panels shown in FIGS. 3 through 14 will be interactively shown to users on display 51 of server 50. The entries may be made by the employees or users themselves or by some sort of supervisory personnel. For the present illustration, we will assume that the entries are made to display 51 by an office supervisor setting up the network.

Figure 3:
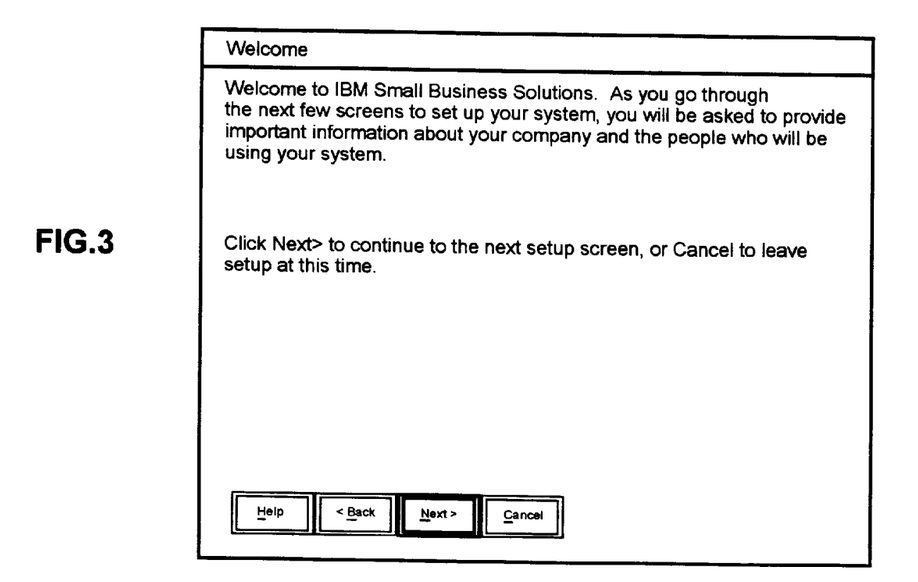
FIG. 3 is a diagrammatic view of an interactive dialog screen on the network server introducing the data entry screens to configure the network installation of the present invention.
Figure 4:
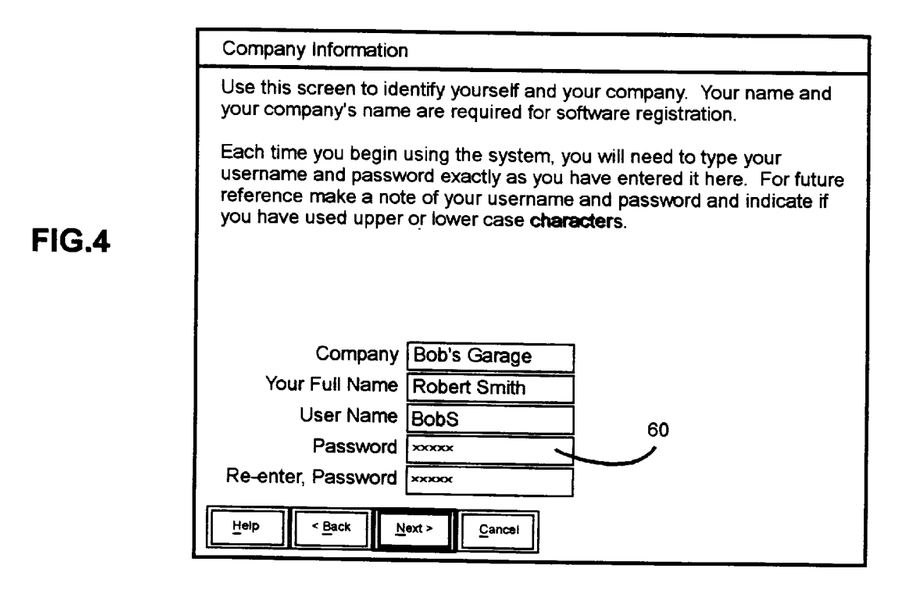
FIG. 4 is the diagrammatic view of an interactive dialog panel for entering company/business information.
Figure 5:
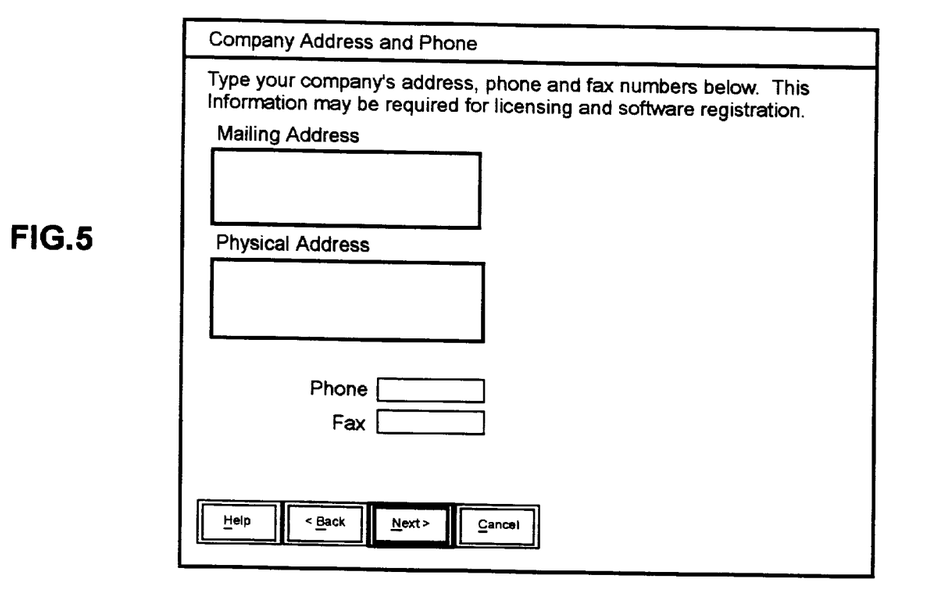
FIG. 5 is the diagrammatic view of the dialog panel for entry of business address information.
Figure 6:
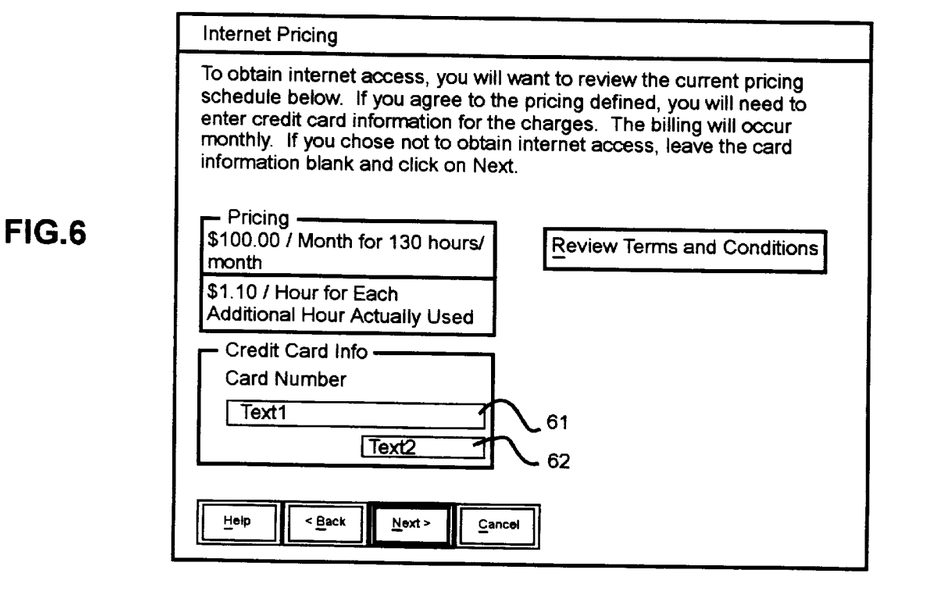
FIG. 6 is a dialog panel for the entry of user information for the selection of an Internet provider for the business setting up the local network.
Figure 7:
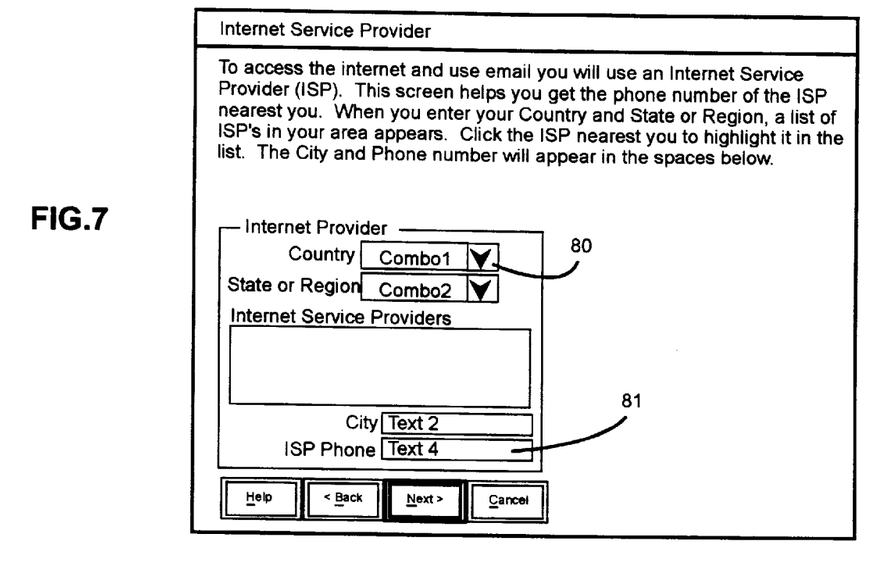
FIG. 7 is a dialog panel for the entry of information setting up the appropriate telephone modem connections to the Internet provider already selected through the panel of FIG. 6.
Figure 8:
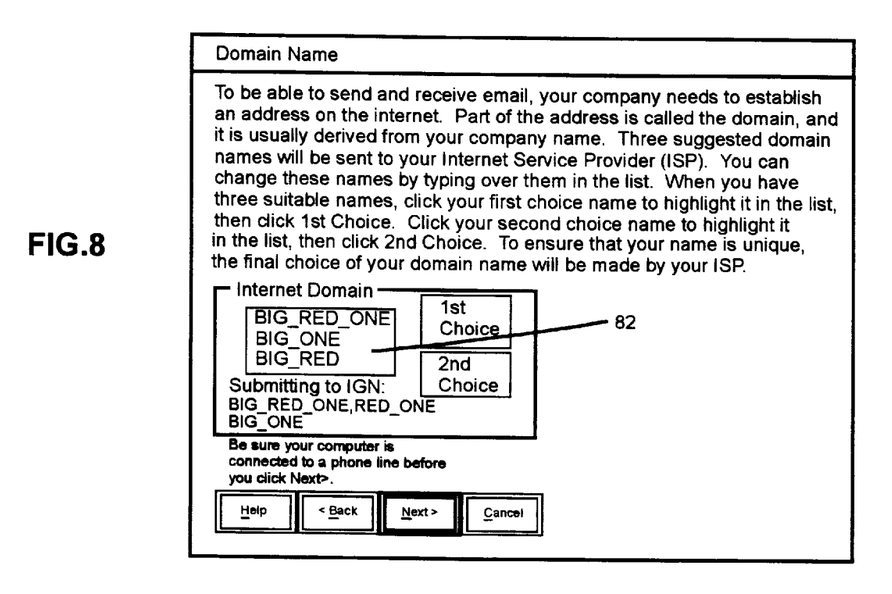
FIG. 8 is a dialog panel for the entry of data for the setting up of E-Mail services.
Figure 9:
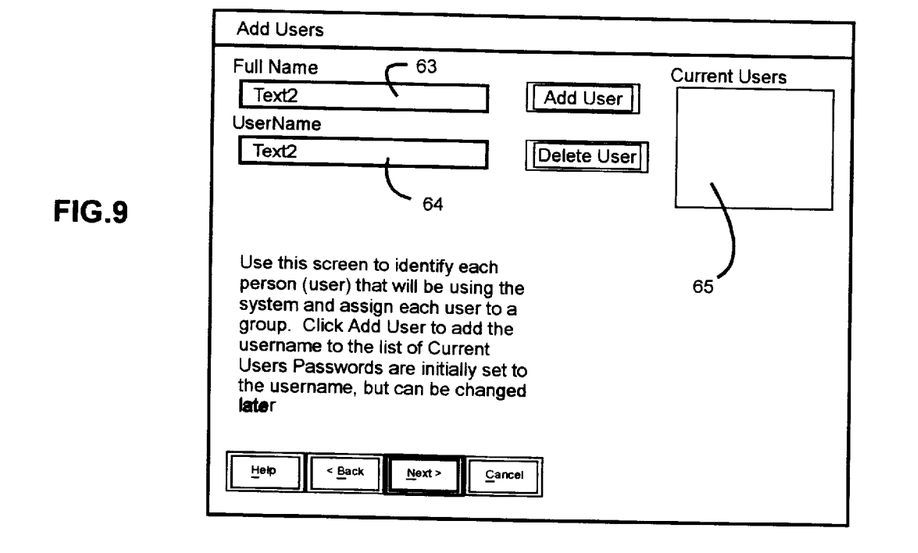
FIG. 9 is a dialog panel for adding users to the network configuration.
Figure 10:
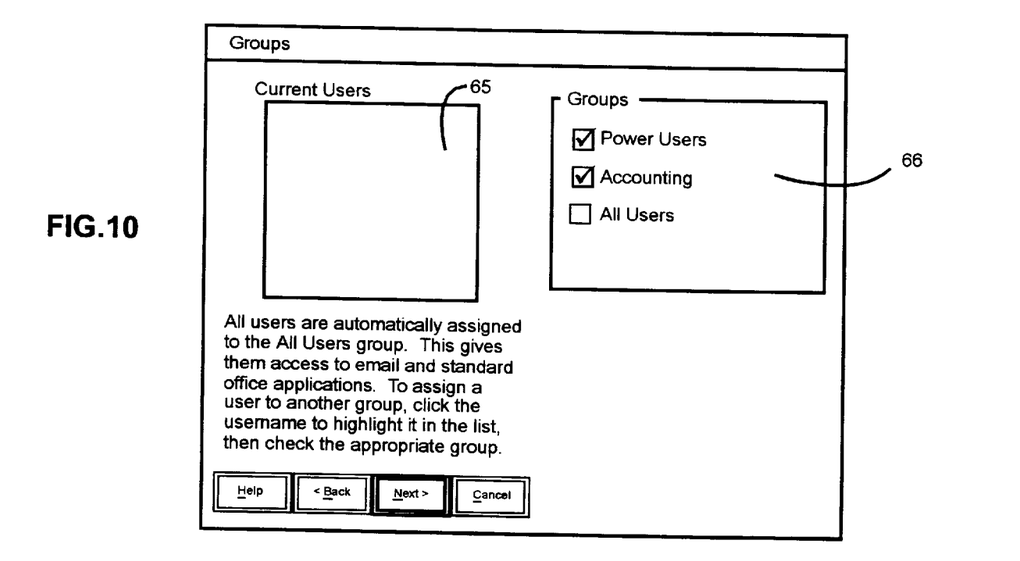
FIG. 10 is a dialog panel for organizing users according to work groups.
Figure 11:
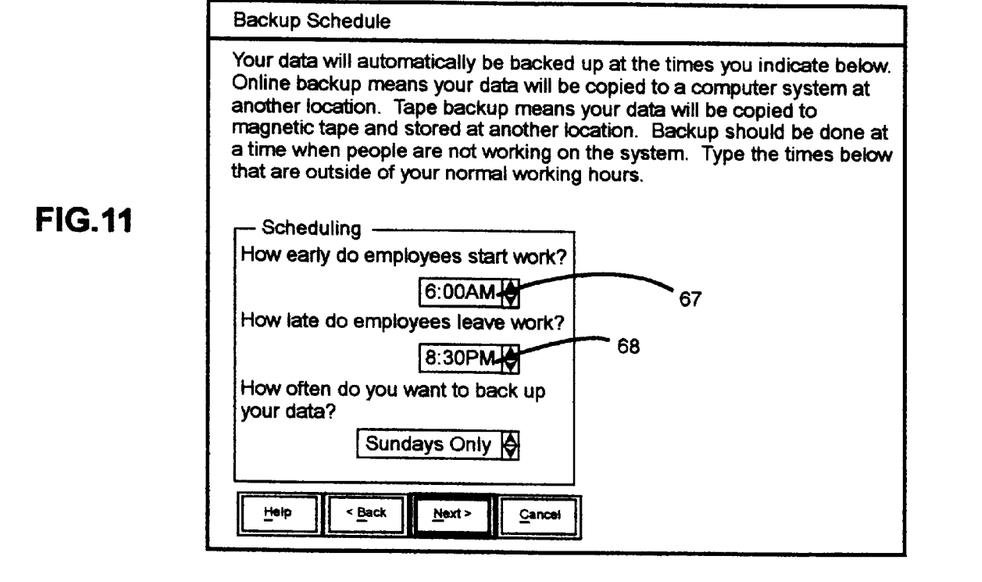
FIG. 11 is a dialog panel for providing first in/last out employee information to provide time for backup and other off-time functions.

The introductory screen panel of FIG. 3 advises the user that what in effect will be noncomputer related information will be solicited and that this information will be used to configure the company's computer network. Then the screen panel of FIG. 4 solicits company and user information including password 60. Next, the screen panel of FIG. 5 gets information about address, phone and facsimile numbers. The screen panel of FIG. 6 prompts the user to price out a variety of Internet services, select a service and to enter user or company credit card information via data entry fields 61 and 62. If the user did not have a provider already selected, then before selecting the type of service, the operator would be prompted via the screen panel of FIG. 7, to enter state and county of residence 80 so that he may be provided a list of providers in that region for provider selection and then a list of local telephone numbers for calling up his provider through his modem, and he is prompted to select an appropriate provider telephone to dial 81. Next, the operator is prompted via the screen panel of FIG. 8 for E-Mail address information including the selection of an Internet domain 82. Then, FIG. 9 shows a display panel through which the current users 65 may be organized and new users may be entered through data entry fields 63 and 64. FIG. 10 is a display panel through which the users 65 may be assigned to functional groups 66 so that this information may be used to allocate program resources. Next, the user may be prompted with a panel, FIG. 11, which will be used to allocate system backup. It prompts for employee start/leave information via data entry fields 67 and 68 so that this information may be used to set likely computer quiescent periods for backing up stored computer data. Such quiescent periods may also be used for other off use functions such as defragmentation of files stored on disk drives, the general cleaning up of files and other housekeeping functions such as the running of antivirus routines.

Figure 12:
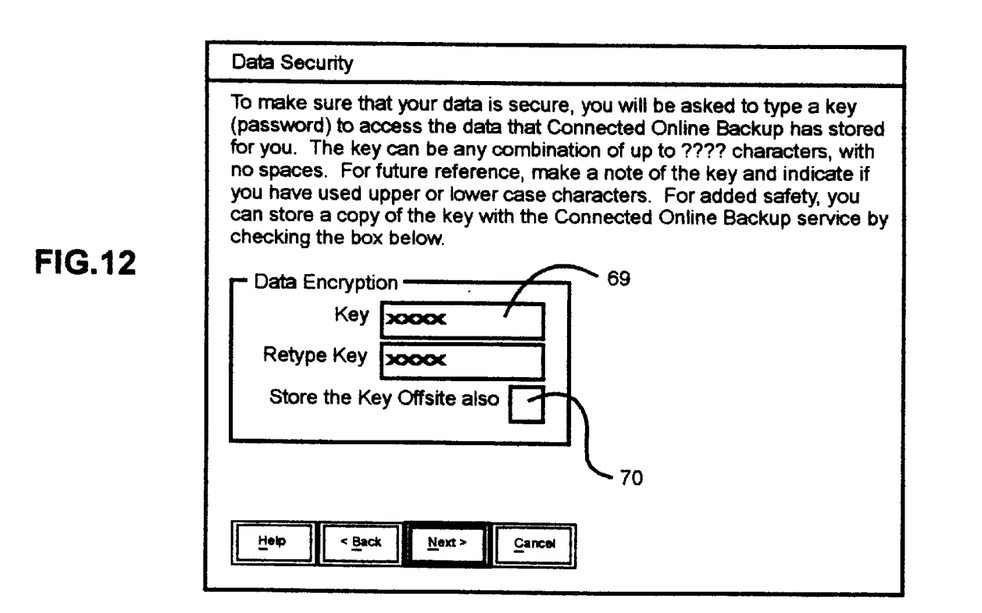
FIG. 12 is a dialog panel for the setting up of data security.
Figure 13:
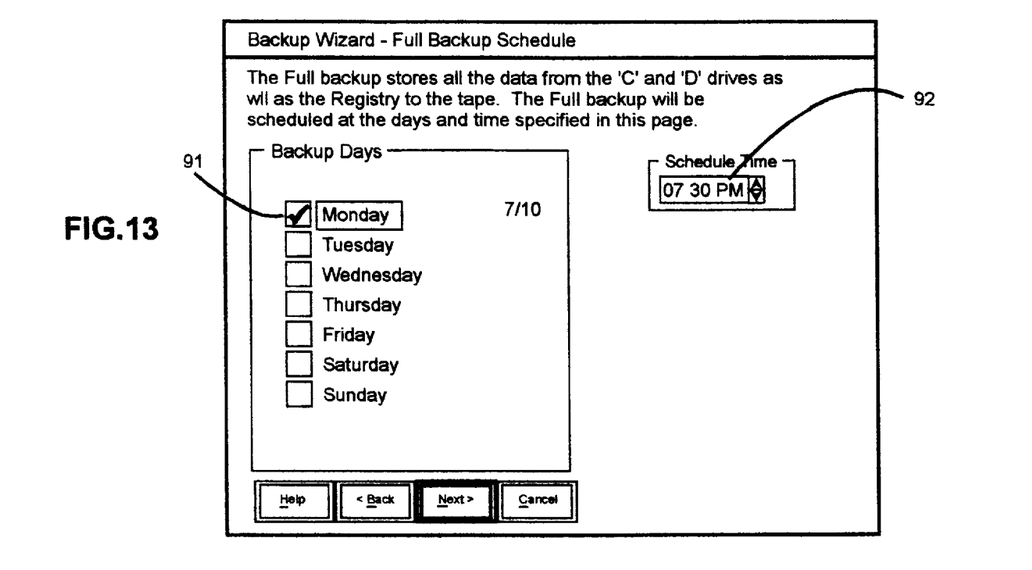
FIG. 13 is a dialog panel for the entry of user data for interactively establishing a time period for full system backup consistent with the employee demographic data previously entered.

The user may also be presented with a data security display panel, FIG. 12, in which data encryption key entries 69 and 70 are prompted for. The operator is then prompted, the screen panel of FIG. 13, to select day 91 and hour 92 times during which the whole local network may be subjected to a full backup to tape of all data entered through any of the systems drives. In the data entry panel of FIG. 14, group and job function information entries 71 and 72 are prompted for which will be used to allocate programs for the particular user. Also the employee's computer hours are solicited 73 and, particularly, graphic hours 74 are important since the system may use this information in an algorithm for setting aside storage space to store and support the user's activities. The panel or a like panel may be used to automatically adjust the displays to the user's vision requirements. This illustration shows a simple routine where the viewer is prompted to read the smallest print in group 75 and indicate it by an appropriate selected entry 76. The system will then provide an appropriate screen resolution to compensate for eyesight variations.

Figure 14:
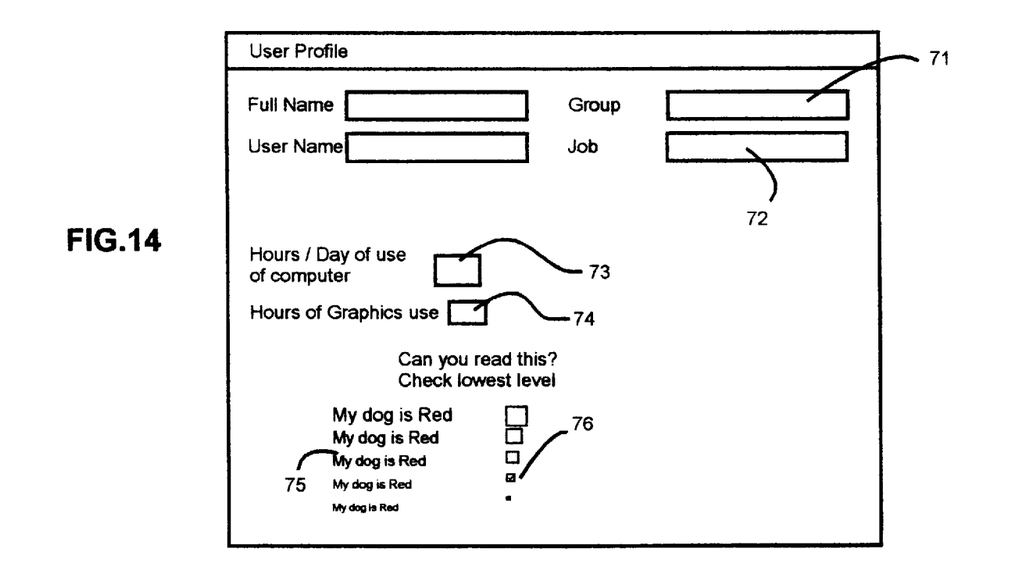
FIG. 14 is a dialog panel for establishing user profiles, as well as user vision levels so as to set screen resolution.
Figure 15:
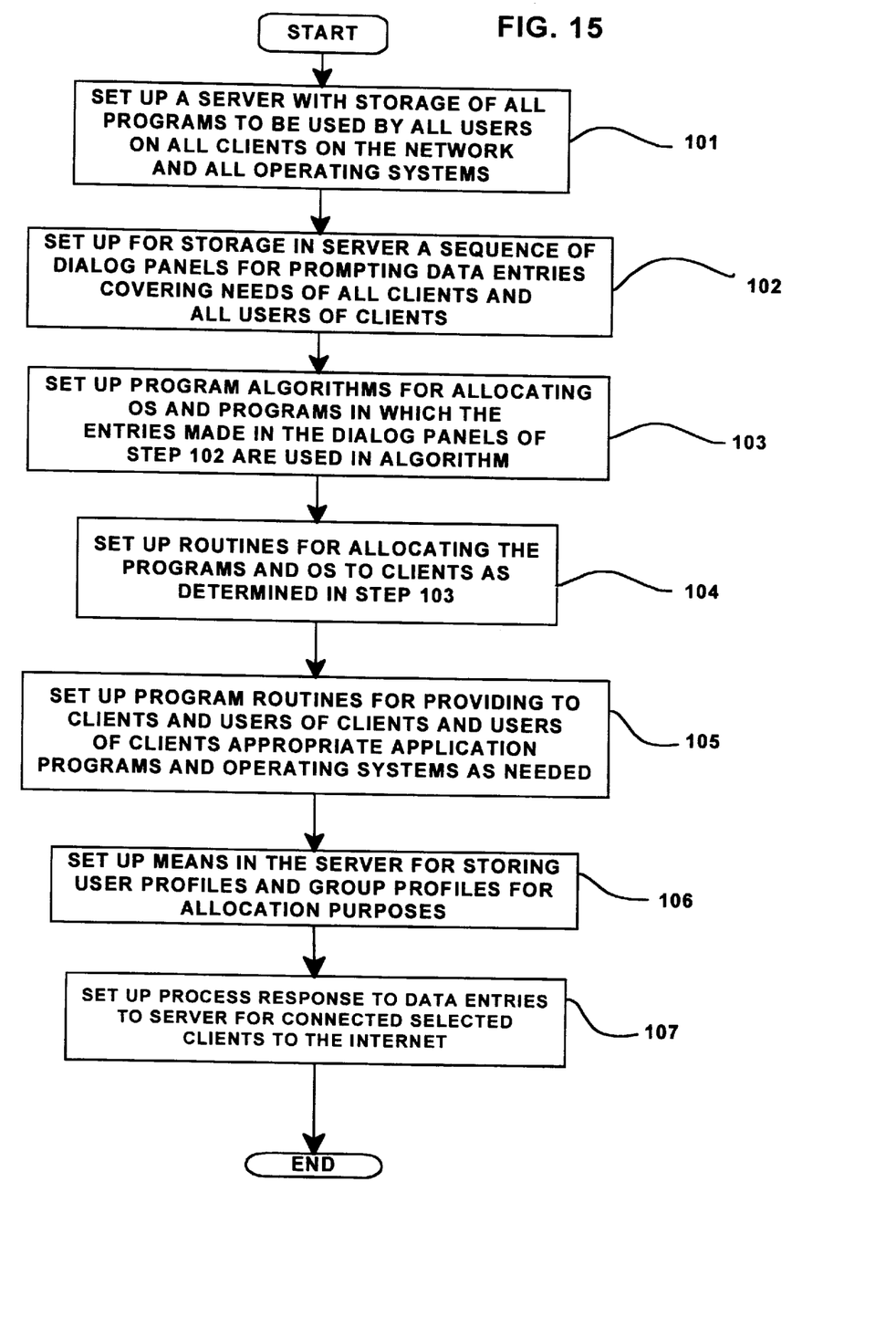
FIG. 15 is a flowchart of the basic elements of the program in the server computer which enables the server to control the data entry described with respect to FIGS. 3 through 14 and subsequently allocate programs.

Now, with respect to FIG. 15 there will be generally described the basic elements of the program in the server computer which enables the server to control the data entry and network installation operations described with respect to FIGS. 3 through 14. The server 50, FIG. 1, is set up to store all programs and operations to be used by a variety of users on the client computers in the network, step 101. A program is set up on the server 50 to display on display 51 a sequence of dialog panels to prompt user entries to provide information covering the needs of all client computers and their users with respect to computer operations, step 102. FIGS. 3 through 14 are illustrative of such panels. Then there is set up in the system, step 103, a series of appropriate algorithms for converting the entries, such as those in the panels of FIGS. 3 through 14 into means for allocating appropriate operating systems and application programs for user and client functions. These algorithms are just simple routines of the type that any computer could use to convert entered data into computer operations. Next, step 104, routines are set up for allocating the computer operating systems and application programs stored in the server computer to clients according to the algorithms of step 103. Program routines are set up, step 105, for running the client computers, e.g. 53, 54 and 55, by providing the client computers and users of the operating systems and application programs as needed or called for according to the algorithms described in steps 103 and 104. Routines are set up in the server computer for storing the whole local network being set up, profiles for users and for groups or classes of such users, step 106, which will be used for determining the application programs to be allocated. FIGS. 9 and 10 show the data entry for creating such profiles. Lastly, step 107, a process is set up for Internet connection.

Figure 16:
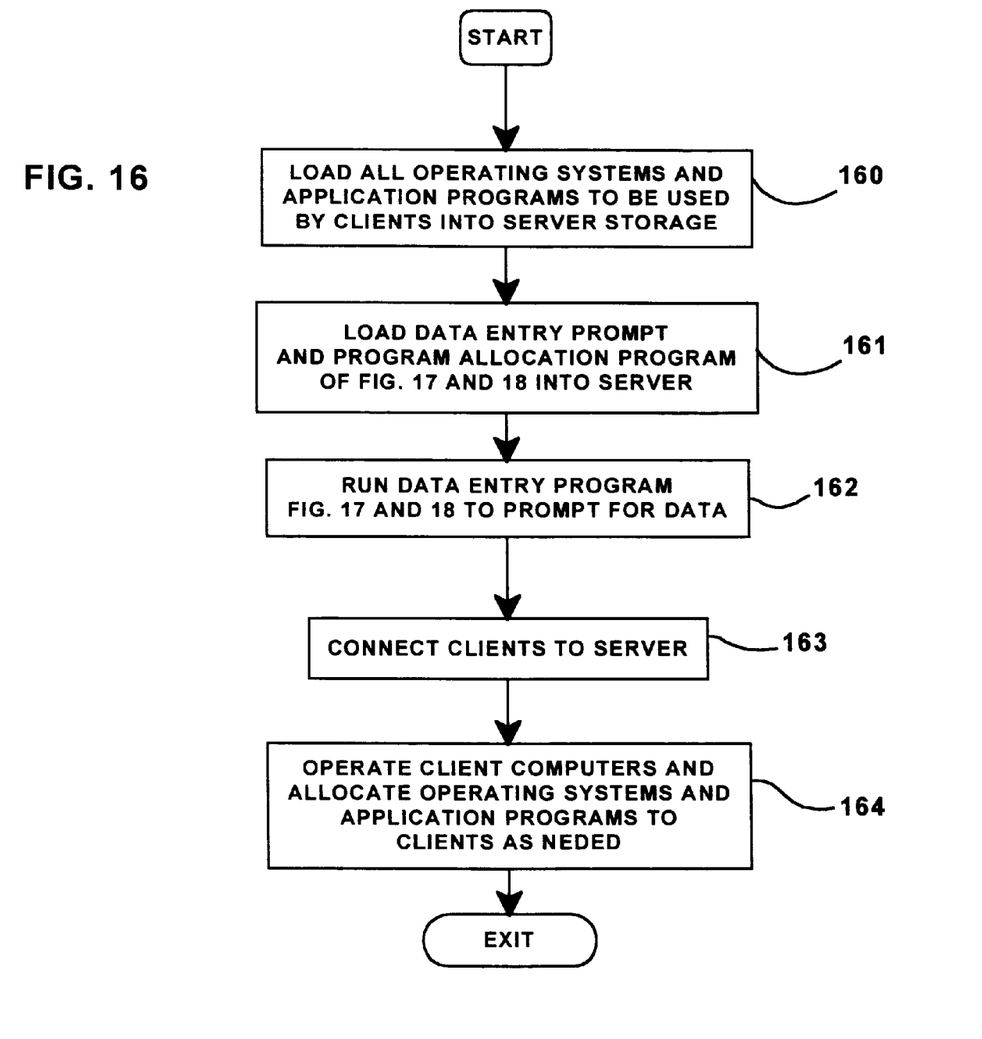
FIG. 16 is a flowchart of the general steps involved in the set up of networks in accordance with the present invention.

FIG. 16 gives a simplified routine for setting up the local network in accordance with this invention. All of the operating systems to be used are loaded into the server computer storage, step 160. Next, the program used in the present invention to prompt for data entries and to allocate accordingly (to be described with respect to FIGS. 17 and 18) is loaded into the server, step 161. Then this loaded program is run, step 162, to enter data, after which the client computers are hooked into the server merely by connecting their appropriate physical connections, step 163. When these connections are completed, then the client computers in the set up network may be run and the server will distribute the appropriate operating systems and application programs to the users of the client computers as needed, step 107.

Figure 17:
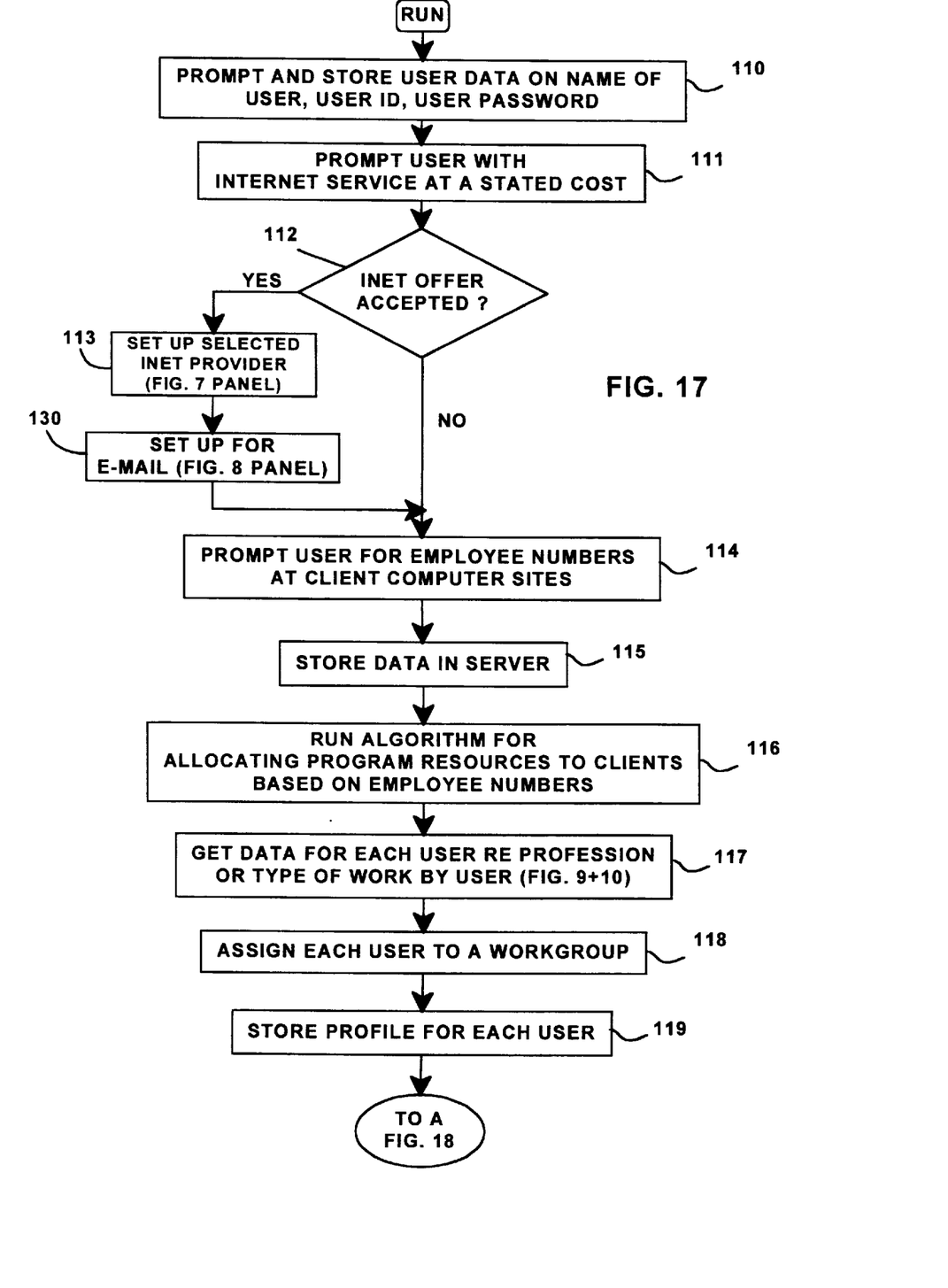
FIGS. 17 and 18 make up a flowchart of a simplified run illustrating the program of FIG. 15.
Figure 18:
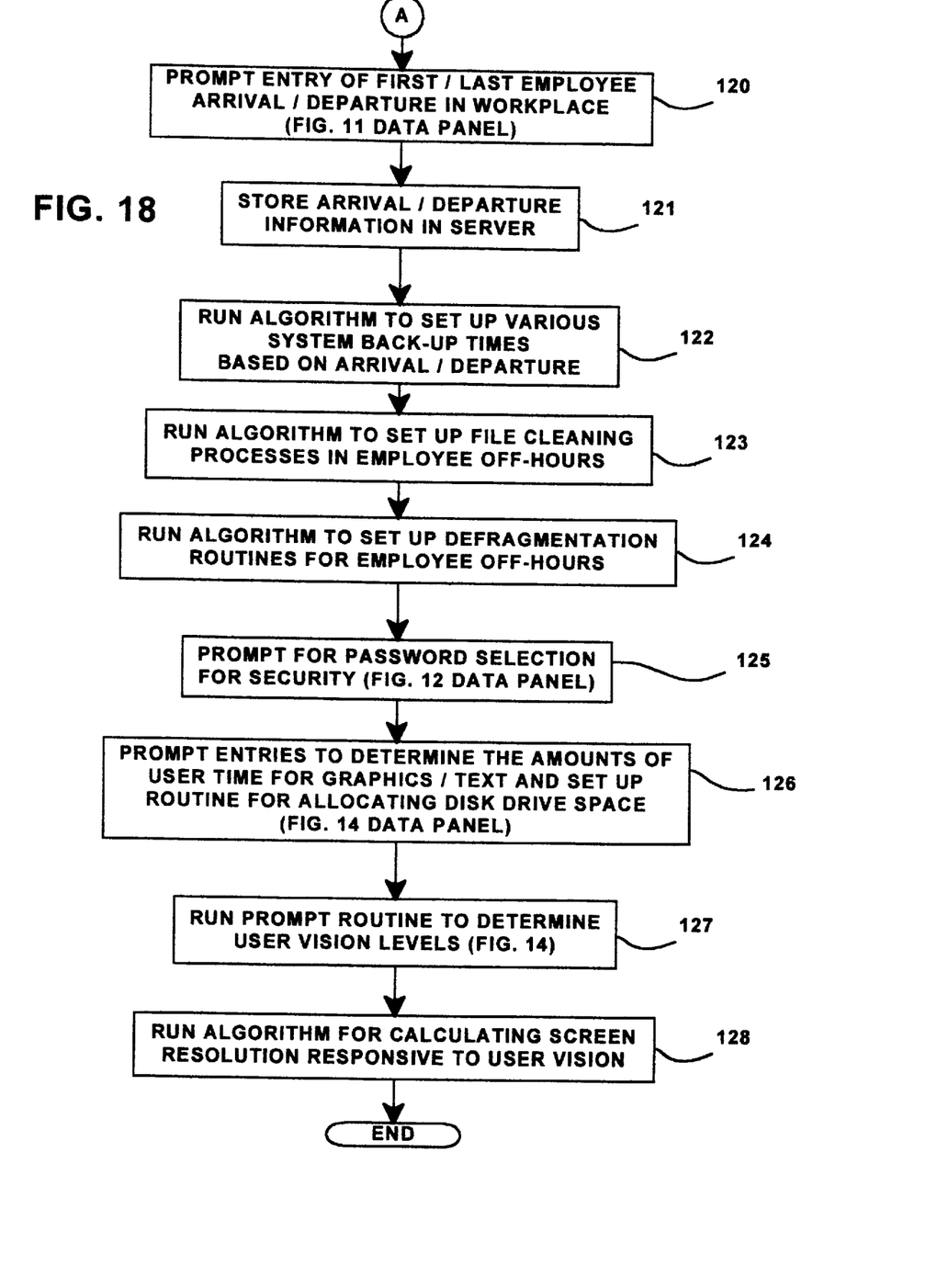

Now with respect to FIGS. 17 and 18, there will be described a modified program run to illustrate many of the steps involved in the prompts, data entries and storage of the entries described above for FIGS. 3 through 14. In this illustrative program run, not all of the possible combinations of data entries will be described. However, it should be readily understood how other selections and data entries discussed with respect to the present invention may be similarly prompted for, selected, stored and used in routines for allocating application programs and operating systems. In the program run, the operator is prompted for user data on name, ID and password, step 110, and then the user is prompted to price out an Internet service provider. If an Internet service provider is selected via decision step 112, Yes (using the display panel of FIG. 6), then the Internet service is set up by having the user set up, step 113, the appropriate provider telephone connections (display panel of FIG. 7) and set up for E-Mail connections, step 130, using the display panel of FIG. 8. After the Internet service is set up or if none is selected, step 112, the operator is prompted for the various employee numbers which may be expected at the client computer sites, step 114. This data is stored in connection with the server, step 115. Then appropriate algorithms may be run for allocating resources to the various client computers based upon employee numbers, step 116. Next, step 117, data is prompted for relative to the profession or type of work of the employee or user. The employee or user may be assigned to a work group for program allocation purposes based upon his type of work, step 118 (see FIGS. 9 and 10 for data entry screens). All of the individual data entered in response to prompts regarding a particular employee or user is stored as a user profile, step 119, and the flow goes to point "A" in FIG. 18.

Step 120, employee arrival/departure information is prompted for (via display panel 11) and this information is stored in the server, step 121. Then an algorithm is run to set up various system backup times based upon the stored arrival/departure information, step 122. In addition, based upon this employee arrival/departure information, algorithms may be run to set file cleaning processes in employee off hours, step 123, and to set defragmentation of disk drive files, step 124. Next, the user is prompted to set up for data security, step 125, including the selection of a password (data panel of FIG. 12). Prompts are run, step 126, which use entries about work habits to determine user times in text producing hours and graphics producing hours and an algorithm is set up to convert such information into the allocation of disk drive storage space. Then, as shown in FIG. 14, a series of prompts is used to test user vision levels, step 127, and this information is used in an algorithm, step 128, to adjust screen resolution levels to compensate for vision limitations, step 128.

One described and claimed implementation of the present invention is as an application program made up of programming steps or instructions. Such a program 40 would be resident in RAM 14 of the server, FIG. 2, during computer operations. Until required by the computer system, the program instructions may be stored in another readable medium, e.g. in disk drive 20 or in a removable memory such as an optical disk for use in a CD-ROM computer input or in a floppy disk for use in a floppy disk drive computer input. Further, the program instructions may be stored in the memory of another computer prior to use in the system of the present invention and transmitted over a local area network (LAN) or a wide area network (WAN), such as the Internet when required by the user of the present invention. One skilled in the art should appreciate that the processes controlling the present invention are capable of being distributed in a variety of computer readable media forms.

Although certain preferred embodiments have been shown and described, it will be understood that many changes and modifications may be made therein without departing from the scope and intent of the appended claims.

What is claimed is:

1. A system for setting up and configuring a network of at least one server computer and a plurality of client computers comprising:

a server computer loaded with a network operating system, an operating system for each of said client computers and substantially all application programs to be used by said client computers, display interface means in said server computer for interactively prompting a user to make a sequence of data entries relative to the business environment within which said client computers and the users of said client computers will operate, means for interconnecting said server computer with said client computers, and means in said server computer for allocating said client operating systems and said application programs based upon said data entries.

2. The system of claim 1 wherein said means for allocating are responsive to user interactive entries on said interconnected client computers.

3. The system of claim 1 wherein said client computers are interactive display computers accessible to users, and said system further includes means for storing a user profile of application programs allocated for each user based upon said data entries.

4. The system of claim 3 wherein said means for storing said user profiles are controlled by said server computer.

5. The system of claim 2 wherein said means for allocating application programs provide a client computer with a program for accessing the Internet.

6. The system of claim 2 wherein said means for allocating application programs provide a client computer with an electronic mail program.

7. The system of claim 1 wherein said display interface means in said server computer further includes means for adding an additional client computer to said network by prompting a user to make a sequence of data entries relative to the computing needs of said additional client computer and the users of said client computer.

8. A method for setting up and configuring a network of at least one server computer and a plurality of client computers comprising:

loading into said server computer a network operating system, an operating system for each of said client computers and substantially all application programs to be used by said client computers, interactively prompting a user to make a sequence of data entries into said server computer relative to the business environment within which said client computers and the users of said client computers will operate, interconnecting said server computer with said client computers, and allocating, through said server computer, said client operating systems and said application programs based upon said data entries.

9. The method of claim 8 wherein said allocating step is responsive to user interactive entries on said interconnected client computers.

10. The method of claim 8 wherein said client computers are interactive display computers accessible to users, and further includes the step of storing a user profile of application programs allocated for each user based upon said data entries.

11. The method of claim 10 wherein step of storing said user profiles is controlled by said server computer.

12. The method of claim 9 wherein at least one of said client computers is allocated with an application program for accessing the Internet.

13. The method of claim 9 wherein at least one of said client computers is allocated with an electronic mail application program.

14. The method of claim 8 further including the step of adding an additional client computer to said network by prompting a user to make a sequence of data entries relative to the computing needs of said additional client computer and the users of said client computer.

15. A computer program having program code included on a computer readable medium for the configuration of a computer network comprising a plurality of client computers and a server computer loaded with a network operating system, an operating system for each of said client computers and substantially all application programs to be used by said client computers, said computer program comprising:

display interface means in said server computer for interactively prompting a user to make a sequence of data entries relative to the business environment within which said client computers and the users of said client computers will operate, and means in said server computer for allocating said client operating systems and said application programs to connected client computers based upon said data entries.

16. The computer program of claim 15 wherein said means for allocating are responsive to user interactive entries on said connected client computers.

17. The computer program of claim 15 wherein said client computers are interactive display computers accessible to users, and said system further includes means for storing a user profile of application programs allocated for each user based upon said data entries.

18. The computer program of claim 17 wherein said means for storing said user profiles are controlled by said server computer.

19. The computer program of claim 16 wherein said means for allocating application programs provide a client computer with a program for accessing the Internet.

20. The computer program of claim 16 wherein said means for allocating application programs provide a client computer with an electronic mail program.

21. The computer program of claim 15 wherein said display interface means in said server computer further includes means for adding an additional client computer to said network by prompting a user to make a sequence of data entries relative to the computing needs of said additional client computer and the users of said client computer.

* * * * *